W. E. ROOT.
VEHICLE SIGNAL.
APPLICATION FILED JULY 5, 1921.
1,420,343.
Patented June 20, 1922.
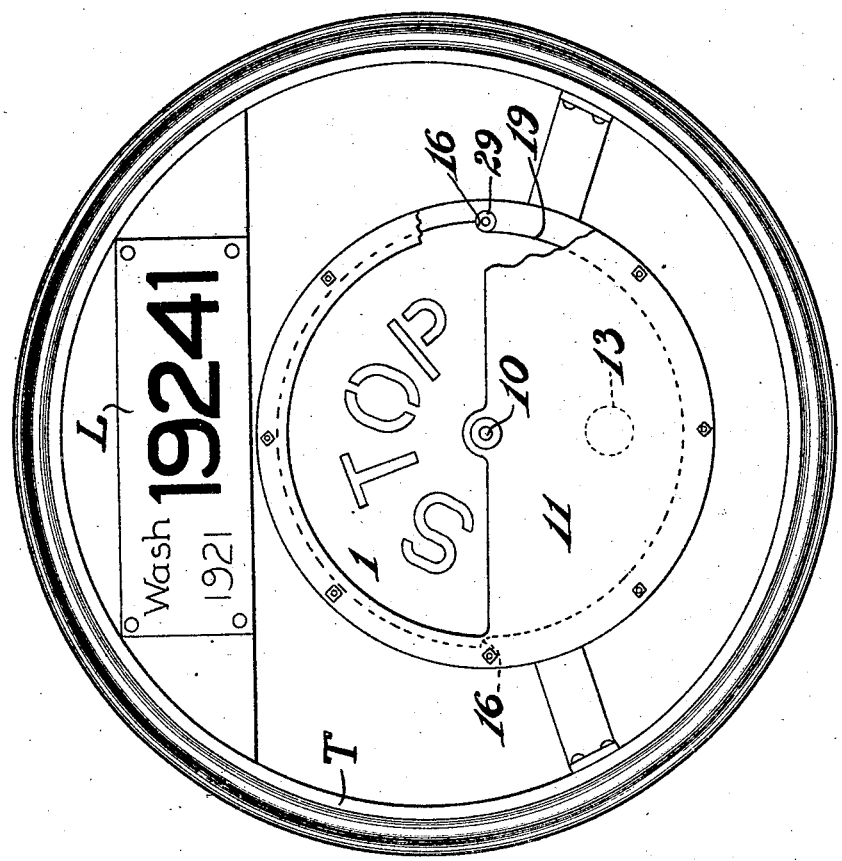
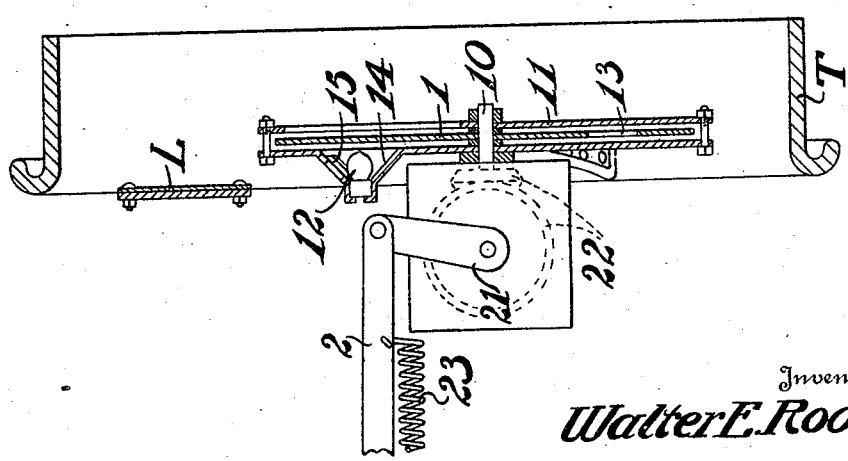
Inventor
Walter E. Root
By H. L. & C. L. Reynolds
Attorneys

UNITED STATES PATENT OFFICE.

WALTER E. ROOT, OF SEATTLE, WASHINGTON.

VEHICLE SIGNAL.

1,420,343.   Specification of Letters Patent.   Patented June 20, 1922.

Application filed July 5, 1921. Serial No. 482,411.

*To all whom it may concern:*

Be it known that I, WALTER E. ROOT, a citizen of the United States of America, and resident of the city of Seattle, in the county of King and State of Washington, have invented certain new and useful Improvements in Vehicle Signals, of which the following is a specification.

My invention relates to automobile signals and particularly to signals which are intended to be mounted upon the rear of a vehicle to warn drivers of following vehicles when it is desired to stop or to slacken pace.

The object of my invention is to provide a signal of the character described which is simply constructed and which may be easily operated either automatically or manually.

A further object is to combine with a danger signal an ordinary running signal such as the common tail light and to cause one or the other of said signals to be extinguished during the time the other signal is in use, and by its extinguishment to call attention to a change taking place.

My invention comprises those novel parts and combinations thereof which are shown in the accompanying drawings, described in the specification and particularly defined by the claims terminating the same.

In the accompanying drawings I have shown my invention in the form which is now preferred by me.

Figure 1 is an elevation of my signal as it would appear to the driver of an approaching vehicle.

Figure 2 is a vertical axial section through my signal.

My signal is particularly adapted to be used in connection with operating mechanism constituting the invention claimed in my co-pending application, Serial No. 404,421, from which this is divided. It may, however, be used with any other type of operating mechanism, either automatically from the vehicle controls, as shown in my application referred to above, or manually. It is best adapted, however, to be operated automatically, when the vehicle brakes are set, to show a stop signal, and to be returned automatically to non-signaling position when they are released.

My signal is adapted to be mounted within the spare tire rack at the rear of a vehicle so that a driver approaching from the rear may be warned if it is the intention of the driver of the vehicle carrying the signal to stop or to slacken pace, or to warn the approaching driver if the vehicle ahead of him has been stopped, it being difficult to determine this at night. I have shown it, therefore, as mounted within the spare tire rack T. The license plate L may be suitably secured adjacent the signal and in position to be illuminated by a light 12 which is used in connection with my invention.

My signal comprises, in general, a disk 1 which carries thereon certain signal indicia, and which is rotatably mounted behind a shield or half disk 11. This half disk normally serves to hide the principal signal indicia. The principal signaling indicia, such as the word "stop," is carried upon a portion of the disk 1 which is normally hidden by the half disk 11. The disk 1 and half disk 11 occupy adjacent parallel planes, the disk 1 being shown as being rotatable with the shaft 10. It is not my intention to attempt to give a variety of signals, for these would not cooperate satisfactorily with the automatic operating means I prefer to employ. A single signal would ordinarily suffice.

Upon the half of the disk 1 which is normally not masked by the half disk 11, I provide an aperture 13, which may be covered by a piece of colored glass or other transparent substance. Mounted so that it is not masked by the half disk 11 is a light casing 14, in which are mounted one or more lamps 12. An opening 15 in the upper portion of the casing 14 permits light to be thrown upward to illuminate the license plate L.

The disk 1 and the half disk 11 are provided with cooperating stops to position the disk 1 in either of its signaling positions. As shown these comprise a fixed pin 29 carried by the half disk 11, which is positioned adjacent a cut away portion 19 in the periphery of the disk 1. This cut away portion extends substantially half way about the disk 1 and at its ends are provided shoulders 16 which form the stops. The pin 29 may be covered with a material, such as rubber, which will deaden the shock and the sound as the shoulder 16 comes into contact with the pin 29.

Suitable means are provided for rotating the disk 1 from one position to another. These may be any that are found suitable or desirable and are shown herein as the bevel gears 22, which are rotatable by means of a lever 21 and a link 2 which extends forward to a connection with some suitable operating means. Means are provided for returning the disk to normal position where the aperture 13 is opposite the lamp 12 and the word "Stop" is hidden, this being shown as a spring 23.

Normally the aperture 13 is in front of the lamp 12 and the word "Stop" is masked by the half disk 11. Parts are retained in this position by the spring 23 and the shoulders 16 and 29. Upon pulling forward the link 2 the disk 1 is caused to be rotated through a half revolution to bring the opposite shoulder 16 into contact with the pin 29. This brings the word "Stop" into view and masks the aperture 13 behind the half disk 11. The word "Stop" may be transparent so that the light 12 will illuminate it at night. Parts will remain in this position while the link 2 is drawn forward in opposition to the spring 23, and until it is permitted to return to normal position. The spring 23 will then return the disk to its first position where the word "Stop" is hidden and the aperture 13 is again unmasked.

What I claim as my invention is:

1. A vehicle signal comprising a disk carrying a signal and a half disk in a parallel plane adapted to mask a half of said disk, said disk and half disk being relatively rotatable, cooperating limit stops for positioning the rotatable member in signaling or in non-signaling positions only, and means for rotating the rotatable member.

2. A vehicle signal comprising a disk carrying a signal, a half disk in a parallel plane adapted to mask a half of said disk, said disk and half disk being relatively rotatable, two pairs of cooperating stops carried by said disk and half disk to position the rotatable member in only signaling and non-signaling positions, respectively, yieldable means for normally maintaining parts in non-signaling position, and means for moving the rotatable member into signaling position.

3. A vehicle signal comprising a disk carrying a signal, a half disk in a parallel plane adapted to mask a half of said disk, said disk and half disk being relatively rotatable, two pairs of cooperating stops carried by said disk and half disk to position the rotatable member in only signaling and non-signaling positions, respectively, yieldable means for normally maintaining parts in non-signaling position, and means operable automatically upon actuation of the vehicle controls for moving the rotatable member into signaling position.

4. A vehicle signal comprising a rotatable disk carrying a signal, a stationary half-disk in a plane parallel thereto and adapted to mask a portion thereof, two pairs of stops, one member of each pair being carried by the disk and the other member thereof being carried by the half-disk, a spring operable to maintain said disk normally at one extreme non-signaling position, and means for rotating the disk into its opposite extreme or signaling position.

5. A vehicle signal comprising a rotatable disk carrying a signal, the edge of said disk being cut away throughout a portion of its periphery to form two angularly-spaced limit stops, a stationary half disk in a plane parallel to said disk and adapted to mask a portion thereof, a stop pin secured to said half-disk and forming a stop selectively engageable with the two limit stops upon the periphery of said disk, whereby said disk may be automatically positioned in signaling or in non-signaling position, and means for automatic rotation of the disk to signaling position.

6. A vehicle signal comprising a rotatable disk carrying a signal, the edge of said disk being cut away throughout a portion of its periphery to form two angularly-spaced limit stops, a stationary half disk in a plane parallel to said disk and adapted to mask a portion thereof, a stop pin secured to said half-disk and forming a stop selectively engageable with the two limit stops upon the periphery of said disk, whereby said disk may be automatically positioned in signaling or in non-signaling position, means for automatic rotation of the disk to signaling position, a spring normally maintaining the disk in non-signaling position, and means for effecting automatic rotation of the disk to signaling position.

7. The combination, in a vehicle signal, of a fixed half disk and a rotatively-mounted disk carrying two different forms of signal indicia, one form upon each half of the disk, and positioned behind said half disk, said half disk masking one only of the forms of signal indicia, a light positioned behind said disk at a point not masked by said half disk, and one of said forms of indicia being transparent to form a tail light, means for rotating said disk to unmask one form and to mask the other form of indicia, means for positioning the disk in either signaling position, and a spring for returning and holding said disk to position where the light may shine through the tail light.

Signed at Seattle, King County, Washington, this 23rd day of June, 1921.

WALTER E. ROOT.